No. 686,460. Patented Nov. 12, 1901.
C. E. KEATOR.
APPARATUS FOR TREATING FELT HAT BODIES.
(Application filed July 23, 1901.)
(No Model.)
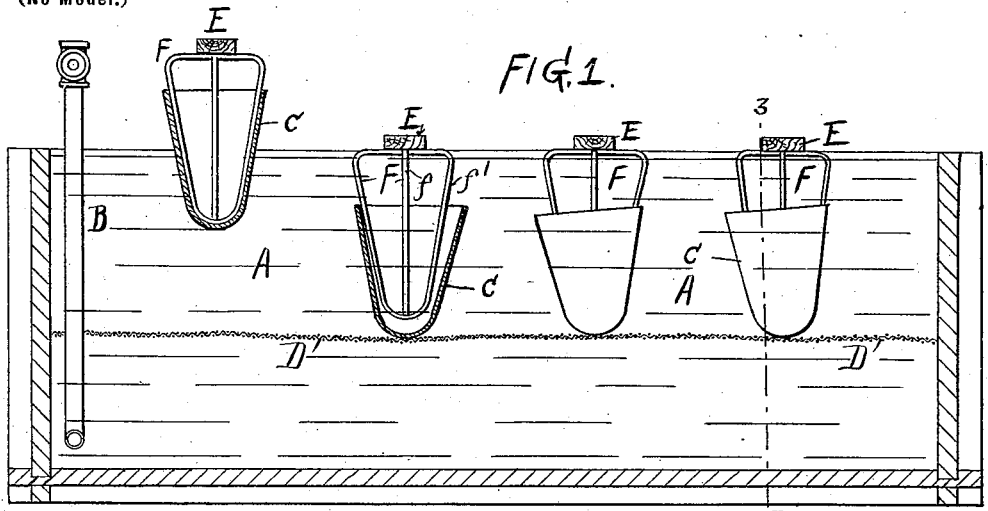
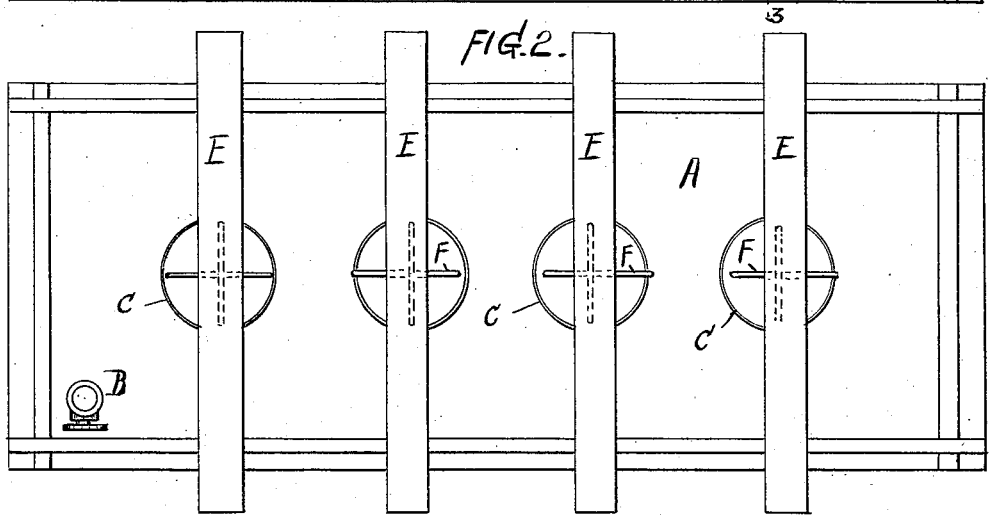
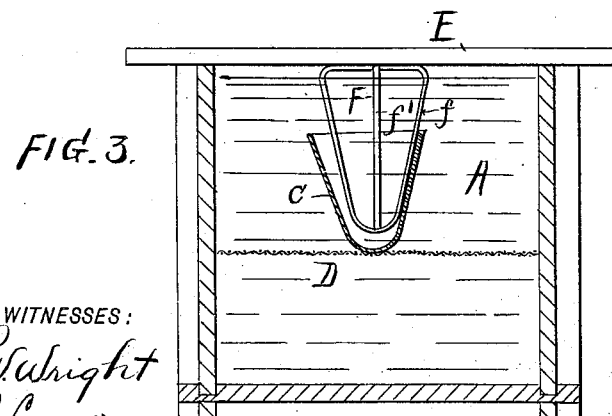
WITNESSES:
INVENTOR
CHARLES E. KEATOR
BY
HIS ATTORNEYS.

UNITED STATES PATENT OFFICE.

CHARLES E. KEATOR, OF BROOKLYN, NEW YORK, ASSIGNOR OF ONE-HALF TO DUNLAP AND COMPANY, OF NEW YORK, N. Y., A CORPORATION OF NEW YORK.

APPARATUS FOR TREATING FELT-HAT BODIES.

SPECIFICATION forming part of Letters Patent No. 686,460, dated November 12, 1901.

Application filed July 23, 1901. Serial No. 69,401. (No model.)

*To all whom it may concern:*

Be it known that I, CHARLES E. KEATOR, a citizen of the United States of America, residing in the borough of Brooklyn, in the county of Kings, State of New York, have invented Apparatus for Treating Felt-Hat Bodies, of which the following is a specification.

In the manufacture of felt hats the conical hat-bodies after having been shrunk are stiffened by being impregnated with a solution or solutions of shellac or other suitable stiffening substance, and subsequently the surface coating of this stiffener is dissolved or "cleared" off the hat-bodies by dipping them in a hot solution of soda or other suitable solvent. In the making of stiff felt hats it has been customary to clear the hat-bodies in two steps—that is, to first dip the brim part, moving it about in the solution, and then to immerse the whole hat-body. This is a slow operation at best and is especially so because it requires the operator to give his whole attention to one hat-body at a time. The operation is also objectionable, because it is difficult to handle the hat-body in such a way that the inside of the hat-body will be cleared as uniformly as the outside and as free from defects.

The object of my invention is to provide an apparatus which will permit the hat-bodies to be handled expeditiously and cleared uniformly inside and out.

My present apparatus is especially useful for the clearing of hat-bodies which have been stiffened by an improved process which I have devised and which permits of the clearing of the hat-bodies by a single complete immersion of the bodies; but the apparatus is also useful for clearing felt-hat bodies which have been stiffened in other ways.

In the accompanying drawings, Figure 1 is a longitudinal section of a "clearing-tank" provided with my improvement. Fig. 2 is a plan view; and Fig. 3 is a transverse section on the line 3 3, Fig. 1.

A is an open-top rectangular tank which is to be filled nearly to the brim with the solution of soda or other suitable solvent, and provision is made for keeping the solution hot by having a valved steam-pipe B opening into the bottom of the tank. At a suitable distance from the bottom of the tank there is arranged a perforated false bottom or horizontal screen D, the depth from the normal level of the liquid and this screen being greater than the height of the conical hat-bodies to be treated.

In connection with the tank I provide a series of devices for immersing the hat-bodies point downward and for maintaining them in an open conical shape while they are immersed. In the drawings I have shown four such devices, each consisting of a cross-strip E long enough to reach over the opposite edges of the tank and carrying upon one face an open conical cage F, which may consist simply of two bent wires $f\,f'$, standing in planes at right angles to each other and to the plane of the cross-strip. Each conical cage is longer than the height of the hat-body, but not long enough to reach quite down to the screen D when the cross-strips E rest upon the sides of the tank.

The desired clearing solution in the tank having been made ready, the operator takes a conical hat-body C and, holding it over the solution with the tip or nose downward, takes a cross-strip and puts its conical cage F into the open end of the hat-body, and by means of this device presses the hat-body down into the solution, as shown at the left of Fig. 1, until the hat-body has been wholly immersed, as shown in the case of the other hat-bodies in the drawings. The opposite ends of the cross-strip then rest upon the opposite sides of the tank, and the hat-body will then rest with its nose upon the screen D; but the cage F will not only keep the hat-body in position, but will also keep it open, so that the solution can act equally on the inside as on the outside of the hat-body. The operator then immerses another hat-body with the second cross-strip and cage, and so on. By the time he has immersed the fourth hat-body in this way the first one is ready to be removed from the solution, and this is done with the aid of an assistant, who, as the operator lifts off the first cross-strip and cage, quickly fishes out the hat-body with a stick before the body has time to collapse and get lost, as it were. Immediately the operator can immerse a fresh hat-body with the first cross-strip and cage.

It will be readily seen that with this apparatus a large quantity of hat-bodies can be cleared with great expedition and with great uniformity. Furthermore, I have found that hat-bodies cleared by means of this apparatus are freer from defects than those cleared by the old hand methods and that if a defect is found on the outside of the hat-body the inside will be found so well cleared that the hat-body can be turned and finished inside out.

I claim as my invention—

1. The herein-described appliance for use in clearing felt-hat bodies, said appliance consisting of the combination of an open tank with means for immersing the hat-bodies tip downward in the solution in the tank and holding them open while immersed.

2. The herein-described appliance for use in clearing felt-hat bodies, said appliance consisting of the combination of an open tank with a series of cross-strips, carrying cages to fit inside the hat-bodies to immerse them and keep them open while immersed.

3. The herein-described appliance for use in clearing felt-hat bodies, said appliance consisting of the combination of an open tank with a series of cross-strips carrying open conical wire cages, as and for the purpose described.

In testimony whereof I have signed my name to this specification in the presence of two subscribing witnesses.

CHAS. E. KEATOR.

Witnesses:
WALTER A. BAYER,
F. WARREN WRIGHT.